United States Patent [19]
Mehmen

[11] Patent Number: 5,205,381
[45] Date of Patent: Apr. 27, 1993

[54] BRAKE SYSTEM

[75] Inventor: Robert J. Mehmen, Shell Rock, Iowa

[73] Assignee: Waterloo Industries, Inc., Waterloo, Iowa

[21] Appl. No.: 657,663

[22] Filed: Feb. 19, 1991

[51] Int. Cl.$^5$ ............................................. B62B 05/04
[52] U.S. Cl. ...................................... 188/19; 188/1.12
[58] Field of Search ............... 188/19, 1.12, 29, 21, 188/9, 2 D

[56] References Cited

U.S. PATENT DOCUMENTS

| | | | |
|---|---|---|---|
| 988,680 | 4/1911 | Wagner | 188/21 |
| 997,531 | 7/1911 | Wright | 188/9 |
| 2,262,288 | 11/1941 | Klipstein . | |
| 3,409,105 | 11/1968 | Clinton . | |
| 3,631,547 | 1/1972 | Messle . | |
| 4,248,445 | 2/1981 | Vassar . | |
| 4,526,253 | 7/1985 | Schmidt | 188/21 |
| 4,674,806 | 6/1987 | Kroon et al. | 188/1.12 |
| 4,716,781 | 1/1988 | Dussault | 188/2 D |
| 4,793,445 | 12/1988 | Collignon | 188/19 |

FOREIGN PATENT DOCUMENTS

| | | | |
|---|---|---|---|
| 24688 | 12/1899 | Netherlands | 188/21 |
| 2165326 | 4/1986 | United Kingdom | 188/2 D |

OTHER PUBLICATIONS

Orscheln A-12 Catalog.

Primary Examiner—Joseph F. Peters, Jr.
Assistant Examiner—Virna Lissi Ansley
Attorney, Agent, or Firm—Allegretti & Witcoff, Ltd.

[57] ABSTRACT

An improved brake system for use on moveable tool storage cabinets, hospital crash carts and the like which is comprised of brakes and a brake actuator and a brake release means, both operatively connected to the brakes. The improved brake system additionally contains an actuator bracket, whereby the actuation of the brake actuator causes the actuator bracket to swing and use available leverage, thereby allowing the brake system to be actuated using minimal force and to allow for the easy adjustment of tension of the brake system. The brake actuator and the brake release are both foot operated as well as being remotely located from the brakes. The brake system is adjustable and is capable of being fitted with a plurality of brakes.

2 Claims, 3 Drawing Sheets

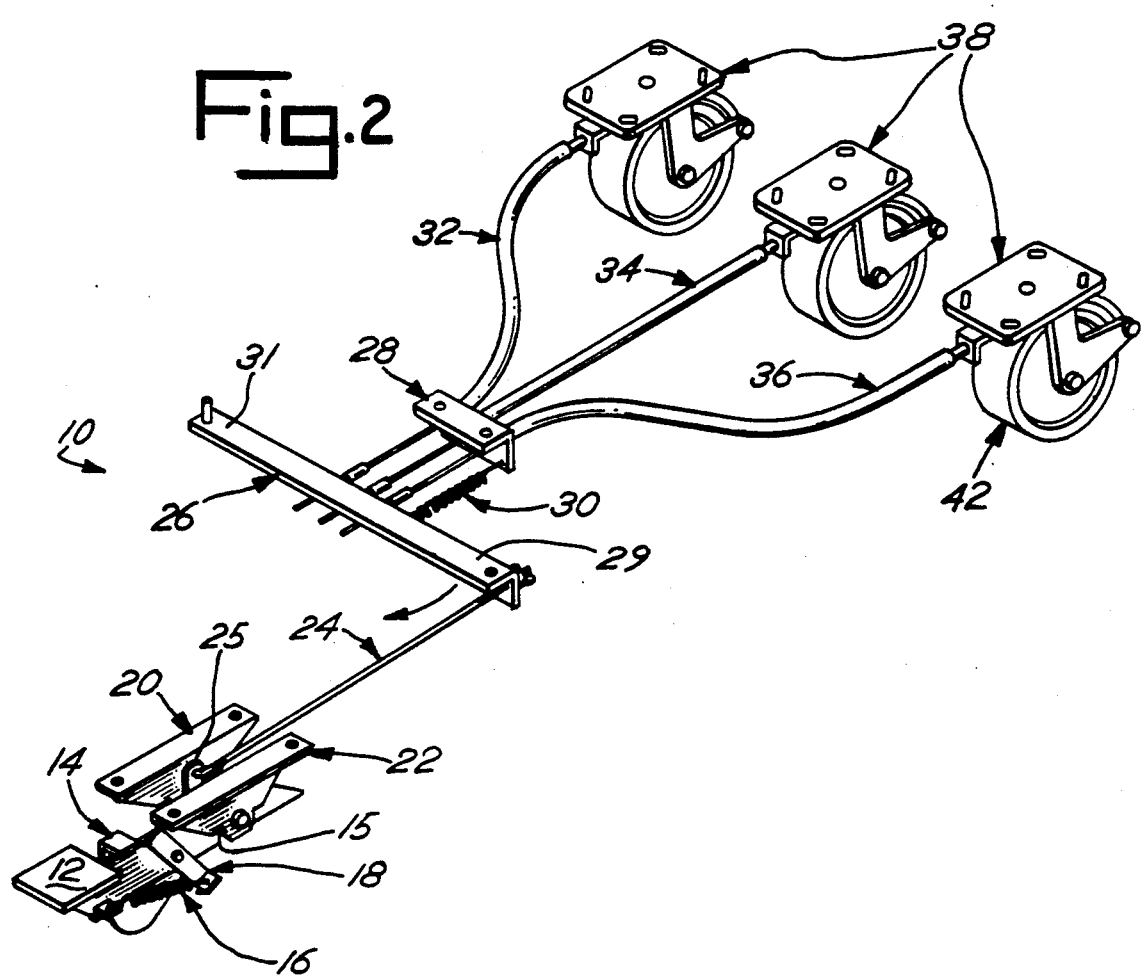

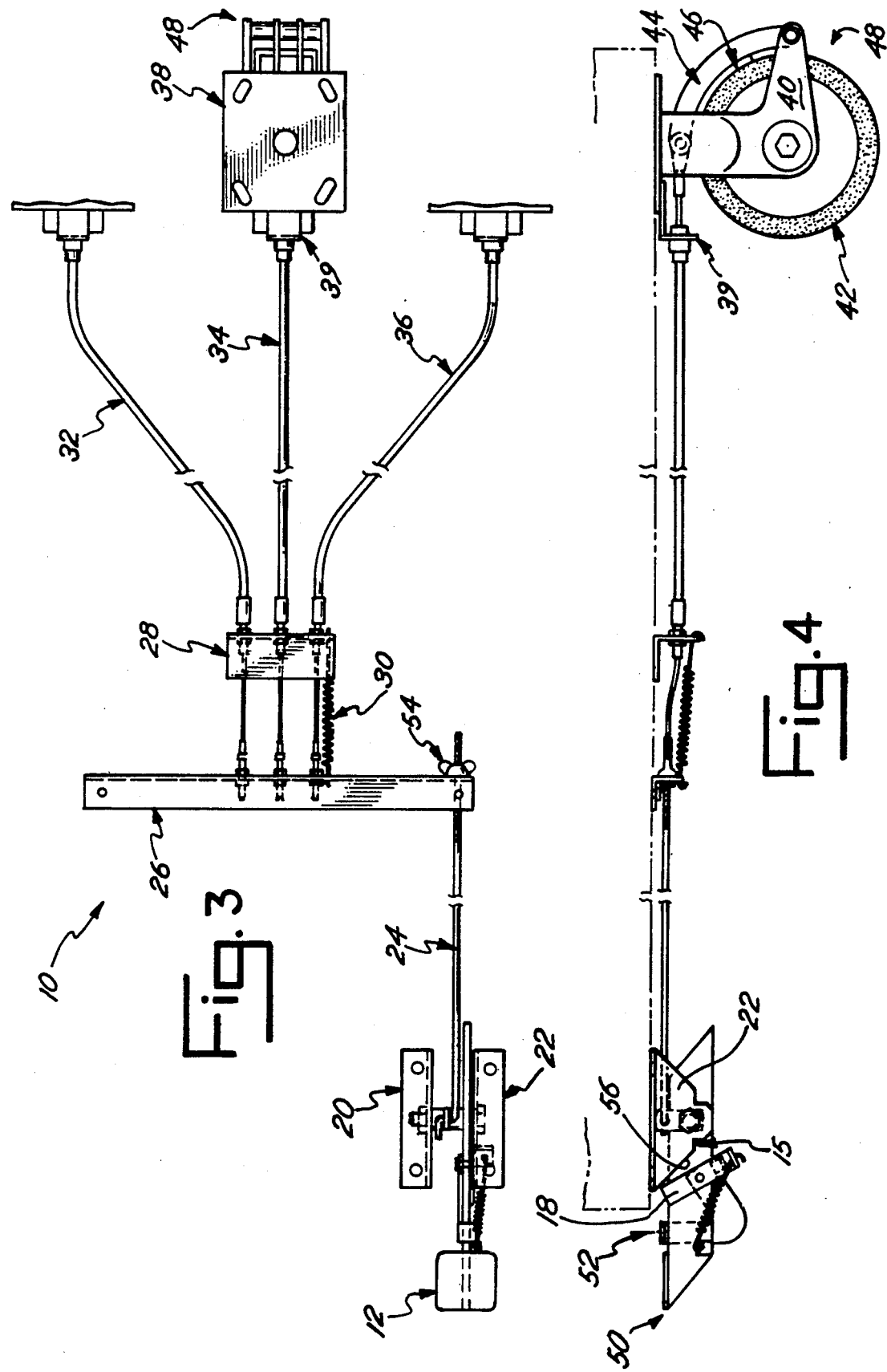

BRAKE SYSTEM

BACKGROUND OF THE INVENTION

A. Field of the Invention

The present invention relates to an improved brake system for use on moveable tool storage cabinets, hospital crash carts and other moveable cabinets and the like. The brake system of the present invention incorporates numerous features not found in the prior art, most notably the existence of a multiple brake means as well as the capability of actuating and releasing the braking means from a single remote location.

B. Description of the Prior Art

Moveable tool storage cabinets and hospital crash carts utilizing some form of a brake system are not new. Various types, shapes and sizes of moveable carts utilizing various forms of a brake system have been in use for many years in one form or another. However, for any moveable tool storage cabinet to be of any practical use to its field, it must be capable of quick mobility as well as possess secure braking power. Further, the movable tool storage cabinet, due to its extreme weight in normal situations, must be outfitted with a brake system that can apply braking pressure to multiple wheels from a single location as well as apply that brake pressure to a sufficient enough degree as to quickly and effortlessly overcome the momentum of the tool storage cabinet when the cabinet is in motion. Again, because of the extreme weight of such cabinets, such a brake system is critically necessary.

One drawback of the current brake systems on moveable tool storage cabinets, hospital crash carts and other similar structures, is the cumbersome method which the user must go through to actuate the brake systems. Current brake systems are constructed in such a way that each wheel or castor of the structure is outfitted with its own self contained brake system, with each such brake system only being actuated and released from each individual wheel location. In such a situation, the user must inconveniently move around the tool cabinet actuating and releasing each and every individual brake system at each of the brake systems' locations. Such a requirement is inefficient, cumbersome and time consuming, as well as being a difficult task to accomplish if the moveable tool storage cabinet is positioned on an uneven or sloping surface.

Another drawback of the current brake systems is the ineffective way in which brake power is applied to each wheel. The brake systems currently in use are the type where a small lever, mounted on the side of each wheel, is actuated to apply brake pressure and released in the other direction to relieve the same brake pressure. In essence, the current brake systems are a friction type setup, capable of applying minimal pressure to each wheel at best. When dealing with moveable tool storage cabinets, most of which weigh hundreds of pounds, simple friction type brake systems are ineffective, and in some situations, dangerous.

In addition to the prior art brake systems described above which are currently in use on moveable tool storage cabinets, hospital crash carts and the like, the applicant also investigated brake systems in general as they are utilized on other non-analogous structures. Again, applicant found such non-analogous brake systems inadequate to satisfy the braking requirements of the present invention.

For these and other reasons, the brake systems of the prior art are not satisfactory. There currently exists a need for a brake system capable of actuating and releasing multiple brakes from a single remote location and capable of applying, through the use of leverage, greater braking power to stop and hold moveable tool storage cabinets and the like, which are most often possessed of great weight.

SUMMARY OF THE INVENTION

Therefore, it is an object of the present invention to increase the efficiency and ease of use of brake systems on moveable tool storage cabinets and the like, by providing a brake system comprised of multiple braking means, all of which are actuated and released from a single remote location.

It is also an object of the present invention to increase the braking and holding capabilities of a brake system through the use of leverage, thereby allowing for the positive braking of moveable tool storage cabinets and the like which may be extremely heavy in weight and which may be stored and/or used on uneven or sloping surfaces.

In total, the present invention centers around a brake system that is easier to use and more efficient in accomplishing its intended goal. These above-mentioned objects and further advantages are achieved by the present invention. More specifically, the brake system of the present invention includes a brake pedal and a brake release, both of which are mounted in brake pedal mounts to the underside of the movable tool storage cabinet. The brake pedal and the brake release are connected to an actuator rod which in turn is connected through an actuator bracket to the brake cables and ultimately the braking means. The brake system is designed and arranged in such a way that the user can actuate and release the braking power of multiple braking means from a single location which is remote from the location of the actual braking means. The further advantage of the present invention stems from the use of available leverage forces, whereby the braking power and capacity of the brake system is greatly increased so as to accommodate extremely heavy objects, such as a moveable tool storage cabinet.

A more complete understanding of the present invention and an appreciation of the features, aspects and advantages contained in the present invention will be clear upon a review of the following detailed description.

BRIEF DESCRIPTION OF THE DRAWINGS

There is shown in the attached drawing a presently preferred embodiment of the present invention wherein like numerals refer to like elements in the various views and wherein:

FIG. 2 is a left front perspective view of the brake system in accordance with the present invention;

FIG. 3 is a top view of the brake system in accordance with the present invention; and FIG. 4 is a front view of the brake system in accordance with the present invention.

DESCRIPTION OF PREFERRED EMBODIMENT

Figure 1:
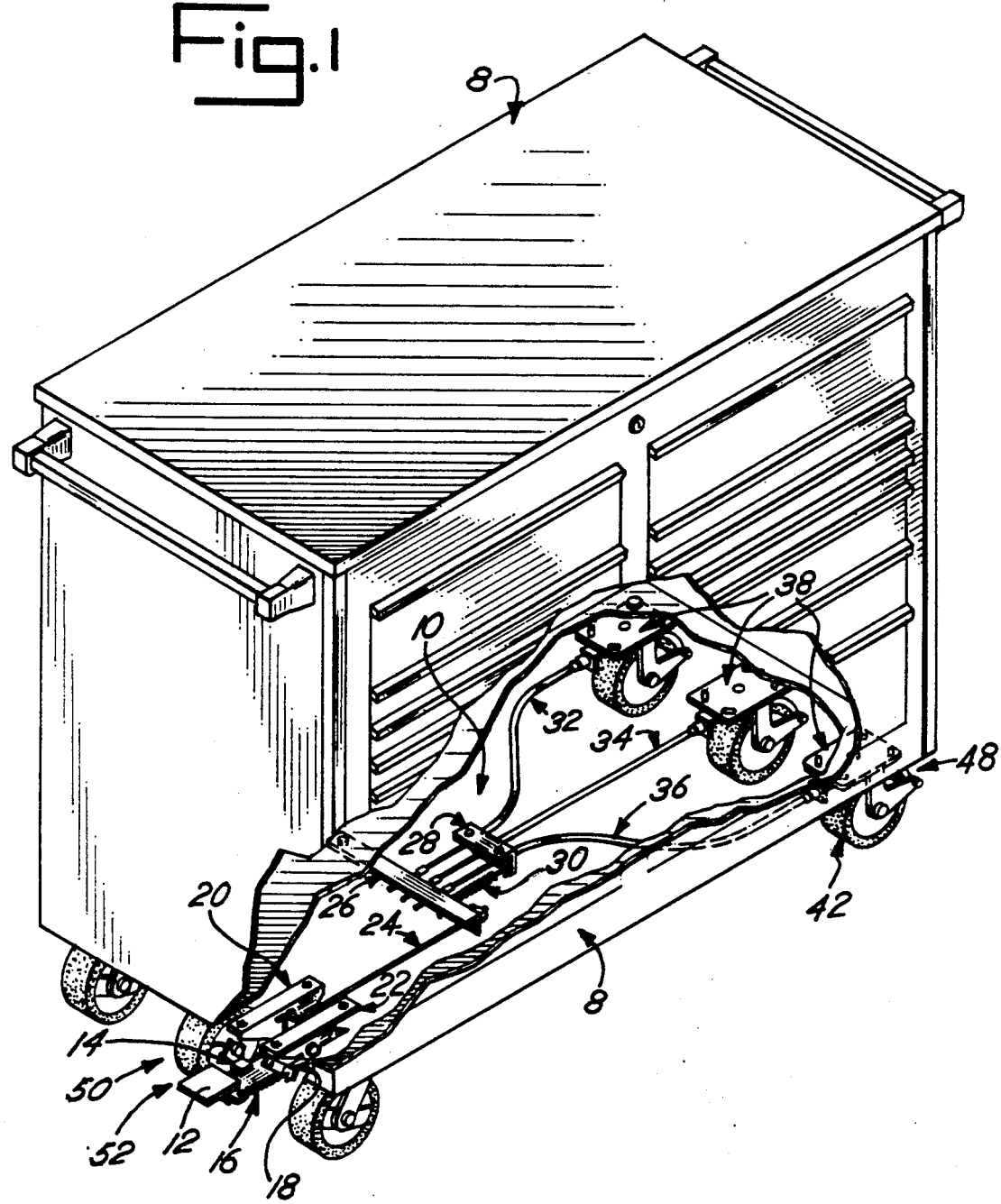
FIG. 1 is a left front perspective view of a preferred embodiment of a brake system in accordance with the present invention, wherein the brake system is shown mounted on the underside of a moveable tool storage cabinet.

Referring now to the drawings, FIG. 2 illustrates the preferred embodiment of the brake system 10 of the present invention in a left front perspective view. Generally, the brake system 10 includes a brake pedal 12 and a brake release 14 which are mounted to the underside of a moveable tool storage cabinet 8, hospital crash cart or other movable cabinet. The brake pedal 12 and the brake release 14 are connected to the braking means 48 through a series of connectors, most notably the actuator rod 24, the actuator bracket 26 and the brake cables 32, 34 and 36. Through manipulation of the foot operated brake pedal 12 and brake release 14, the operator is able to apply braking pressure to the braking means 48 in a quick and efficient manner.

More specifically, as can be seen from FIG. 2, the first brake pedal mount 20 and the second brake pedal mount 22 are L-shaped brackets which are mounted in spacial relationship to one another on the underside of the moveable tool storage cabinet 8, hospital crash cart or other moveable cabinet. The first brake pedal mount 20 and the second brake pedal mount 22 are mounted in such a way that the brake pedal 12, the brake release 14 and the brake catch 18 all can be mounted and fastened between the first brake pedal mount 20 and the second brake pedal mount 22.

Operatively connected to an opening in the brake pedal 12 is an actuator rod 24. The actuator rod 24 is a metal rod with threads at one end and two 90% bends at the other end. The end of the actuator rod 24 with the two 90% bends is inserted into the opening 25 in the brake pedal 12 and the threaded end of the actuator rod 24 is inserted and fastened with a wing nut 54 into an opening in one end 29 of the metal actuator bracket 26. The other end 31 of the actuator bracket 26 is operatively connected to the underside of the moveable tool storage cabinet 8.

Located toward the center of the L-shaped actuator bracket 26 are three openings into which the three brake cables 32, 34 and 36 will be fastened. The three brake cables 32, 34 and 36 thereafter pass through and are fastened to another L-shaped bracket called the cable retainer 28. The cable retainer 28 is permanently fastened to the underside of the movable tool storage cabinet 8.

As can be seen from FIGS. 2, 3 and 4, the three brake cables 32, 34 and 36 then pass through and are mounted within the caster bracket 39 which is permanently connected to the caster plate 38 which is bolted or otherwise fastened to the underside of the moveable tool storage cabinet 8. Welded to the underside of each caster plate 38 are two L-shaped wheel mounts 40 to which at one end is operatively fastened a curved brake arm 44. The curved brake arm 44 is operatively fastened at its other end to the brake cables 32, 34 and 36. Glued or otherwise adhered to the inner surface of each brake arm 44 is a brake pad 46. The above is a basic description of how the various parts of the preferred embodiment of the present invention are connected to and relate to each other in spacial relationship.

Referring back again to the drawings, the operation of the brake system 10 begins when the operator depresses the flat pad of the brake pedal 12 with his/her foot. In doing so, the brake pedal 12 exerts tension on the actuator rod 24 which in turn causes the actuator bracket 26 to swing in the direction of arrow 27 about bracket end 31. In so swinging, the actuator bracket 26 exerts tension on the brake cables 32, 34 and 36 which then causes the brake arm 44 to move toward the wheel 42, and in so doing, causes the brake pad 46 to come in contact with the wheel 42, thereby causing the moveable tool storage cabinet 8 to come to rest.

If the operator does not wish to temporarily lock the brake system 10, all he/she needs to do is then release his/her foot off the brake pedal 12 and the large spring 30 will then swing the actuator bracket 26 back to its original position. In doing so the actuator rod 24 would be moved, along with the brake pedal 12, to their original positions. However, most important, the tension which was previously present on the brake cables 32, 34 and 36, will no longer be present, and as such, the brake pad 46 will be lifted off of the wheel 42 and the brake system 10 will be disengaged.

Should the operator wish to temporarily lock the brake system 10 while the brake system 10 is actuated, the operator need only depress the brake pedal 12 in a downward motion sufficient enough to engage the brake catch 18 into the mount 22 at 15. As can be seen in FIG. 4, if the operator depresses the brake pedal 12 far enough, the small spring 16 which is mounted between the brake pedal 12 and the brake catch 18 will cause the brake catch 18 to ride down the angled side 56 of the second brake pedal mount 22 until the brake pedal 12 is depressed to such an extent that the brake catch 18 can engage the mount 22 at 15. At this point, the brake system 10 is locked in place and the operator can take his/her foot off the brake pedal 12 with the brake system 10 remaining locked.

When the operator then wishes to unlock the brake system 10, the operator need only depress the brake release 14 which will cause the brake catch 18 to move down and out of the mount 22 at 15 and thereby allow the brake pedal 12, the brake release 14 and the brake catch 18 to move back to their original unlocked positions.

The final aspect of the present invention which needs mention is the fact that the brake system 10 contains numerous adjustment points. First, the brake cables 32, 34 and 36 can be adjusted at the point where they are fastened to the actuator bracket 26. Such an adjustment is important because the actuator bracket 26 swings from one end when actuated, which would cause each brake cable 32, 34 and 36 to move different amounts as the swing of radius would be different for each brake cable 32, 34 and 36. By having adjustments to the brake cables 32, 34 and 36 at the actuator bracket 26, the potential problem of exertion of differing braking pressures on the various wheels 42 should be eliminated, while at the same time allowing for increased braking pressures due to the leverage involved. Second, at the threaded end of the actuator rod 24 is a wing nut 54 which when adjusted, determines the amount of swing on the actuator bracket 26 and at what point, or even if, the brake catch 18 will be able to engage the mount 22 at 15.

While a presently preferred embodiment of the invention has been shown and described, it is apparent that various changes and modifications may be made therein without departing from the invention. Therefore, it is intended to cover in the appended claims, all such changes and modifications as fall within the true spirit and scope of the invention.

What is claimed is:

1. A moveable tool storage cabinet comprising a planar underside portion, a plurality of attached wheels, and a brake system, the brake system including:

- brake mechanisms for slowing the motion of a plurality of said wheels, each said brake mechanism including two L-shaped wheel mounts, a curved brake arm pivotally attached at one end to said L-shaped wheel mounts, and a brake pad on said curved brake arm;
- a brake cable for engaging each of said brake mechanisms, said brake cables being in a plane substantially parallel with said planar underside portion of said moveable tool storage cabinet, and also being operatively attached to said curved brake arms;
- an actuator bracket having an attached end and a free end, said attached end being operatively attached to said planar underside portion of said moveable tool storage cabinet, said free end of said actuator bracket being adapted to swing about said attached end in a plane substantially parallel to said planar underside portion of said moveable tool storage cabinet, and said brake cables being operatively attached to said actuator bracket intermediate to said attached and free ends of said actuator bracket;
- an actuator rod for swinging said actuator bracket, said actuator rod having one end operatively attached to said free end of said actuator bracket and being in a plane substantially parallel with said planar underside portion of said moveable tool storage cabinet;
- a brake pedal pivotally mounted to said moveable tool storage cabinet and operatively attached to said actuator rod, said free end of said actuator bracket swinging upon engagement of said actuator rod by said brake pedal, thereby engaging the brake mechanisms;
- a brake catch adapted to lock said brake pedal in a position where said brake pedal is engaging said actuator rod; and
- a brake release pedal operatively attached to said brake catch and adapted to release said brake catch, thereby releasing said brake pedal from a locked position and disengaging said actuator rod.

2. A moveable tool storage cabinet as in claim 1, further comprising two angle brackets that are attached to said planar underside portion of said moveable tool storage cabinet, each of said angle brackets having a first and a second planar portion, said first planar portion of each said angle bracket being directly connected to said planar underside portion of said moveable tool storage cabinet, said second planar portions being in a parallel, spaced relationship from one another, said brake pedal located between said second planar portions and pivotally attached to said second planar portions so as to permit vertical movement of said brake pedal, said second planar portion of at least one of said angle brackets having a notch capable of receiving and retaining said brake catch when said brake pedal is sufficiently depressed.

* * * * *